United States Patent
Yami et al.

(10) Patent No.: US 7,716,481 B2
(45) Date of Patent: May 11, 2010

(54) SYSTEM AND METHOD FOR SECURE EXCHANGE OF TRUST INFORMATION

(75) Inventors: Sameer Yami, Irvine, CA (US); Amir Shahindoust, Laguna Niguel, CA (US); Michael Yeung, Mission Viejo, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 1213 days.

(21) Appl. No.: 11/272,904

(22) Filed: Nov. 14, 2005

(65) Prior Publication Data

US 2007/0113089 A1   May 17, 2007

(51) Int. Cl.
  *H04L 9/00* (2006.01)
(52) U.S. Cl. ..................................... 713/170
(58) Field of Classification Search .............. 713/170
  See application file for complete search history.

(56) References Cited

U.S. PATENT DOCUMENTS

| | | | |
|---|---|---|---|
| 2003/0145220 A1 | 7/2003 | Cossel et al. | |
| 2003/0166397 A1 | 9/2003 | Aura | |
| 2003/0226036 A1 | 12/2003 | Bivens et al. | |
| 2004/0117663 A1 | 6/2004 | Colvin | |
| 2004/0139319 A1* | 7/2004 | Favazza et al. | 713/168 |
| 2004/0225894 A1 | 11/2004 | Colvin | |
| 2004/0236938 A1 | 11/2004 | Callaghan | |
| 2005/0102244 A1 | 5/2005 | Dickinson et al. | |
| 2005/0154925 A1 | 7/2005 | Chitrapu et al. | |

* cited by examiner

*Primary Examiner*—Eleni A. Shiferaw
*Assistant Examiner*—Travis Pogmore
(74) *Attorney, Agent, or Firm*—Tucker Ellis & West LLP

(57) ABSTRACT

The present invention is directed to a system and method for propagation of security information for secure information exchange. Existing and new authentication information are gathered and combined into the same header. The header is attached to electronic document data encrypted by a client device and sent via a computer network to a document processing device. The document processing device, upon receipt of the header and document first decrypts the header and uses the existing authentication information to qualify the new authentication information by validating the existing authentication information through a trusted authentication mechanism. Once validated, the new authentication information is available for future document processing operations by the document processing device and other trusted document processing devices.

18 Claims, 3 Drawing Sheets

SYSTEM AND METHOD FOR SECURE EXCHANGE OF TRUST INFORMATION

BACKGROUND OF THE INVENTION

This invention is directed to a method and system for the propagation of security information for secure information exchange. More particularly, this invention is directed to a method and system for associating new authentication information with existing authentication information and using the existing authentication information to qualify the new authentication information for further usage.

Office settings typically include a variety of document processing devices, such as printers, copiers, facsimile machines, scanners, and the like, which employ little to no inherent data security. A user with physical access to the computer network of such an office is able to view or intercept the plain text transmission of documents sent by another user over the network. Various attempts to encrypt document data have been employed, such as requiring the input of a password at the receiving document processing device to output the document. In typical secure document processing operations, a user encrypts a document for transmission to a document processing device. Once received, the document processing device decrypts the data and outputs the document accordingly. However, to maintain security, each document processing device on a computer network employs a unique public key/private key encryption combination. Each of the security protocols requires the preliminary step of exchanging the encryption or security keys. Such an exchange requires a two-sided communication between the client and the server. When the client is only able to send information to the server, and not receive any information back, it becomes important to capture some kind of authentication information from existing sources on the client side, and also generate new authentication information on the client, for use for the specific purpose of communicating with a particular server.

Thus, there is a need for the association of existing authentication information with the new authentication information, and using the existing authentication information to qualify the new authentication information for further usage.

SUMMARY OF THE INVENTION

In accordance with the present invention, there is provided a system and method for propagation of security information for secure information exchange.

Further in accordance with the present invention, there is provided a system and method for associating new authentication information with existing authentication information and using the existing authentication information to qualify the new authentication information for further usage.

In accordance with the present invention, there is provided a system for propagation of security information for secure information exchange. The system includes receiving means adapted to receive a first electronic document. The first electronic document includes initial authentication data containing first and second authentication portions. The first authentication portion represents a previously implemented authentication and the second authentication represents a forthcoming authentication operation. The system also includes accessing means suitably adapted to access an authentication device corresponding to the first authentication data. In addition, the system includes receiving means adapted to receive, from the authentication device, confirmation data representing acceptability of the second authentication data portion.

Further, in accordance with the present invention, there is provided a method for propagation of security information for secure information exchange. The method begins with the receipt of a first electronic document including initial authentication data. The initial authentication data includes first and second authentication data portions, with the first authentication portion representing a previously implemented authentication and the second authentication data portion representing a forthcoming authentication operation. Next, an authentication device is accessed corresponding to the first authentication data. Following access, the authentication device returns confirmation data representing acceptability of the second authentication portion.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for propagation of security information for secure information exchange. In particular, the present invention is directed to a system and method for associating new authentication information with existing authentication information and using the existing authentication information to qualify the new authentication information for further usage. In the preferred embodiment, as described herein, the terms "server" and "document processing device" are used to refer to an electronic device representative of the server portion of a client-server relationship, unless otherwise noted.

Figure 1:
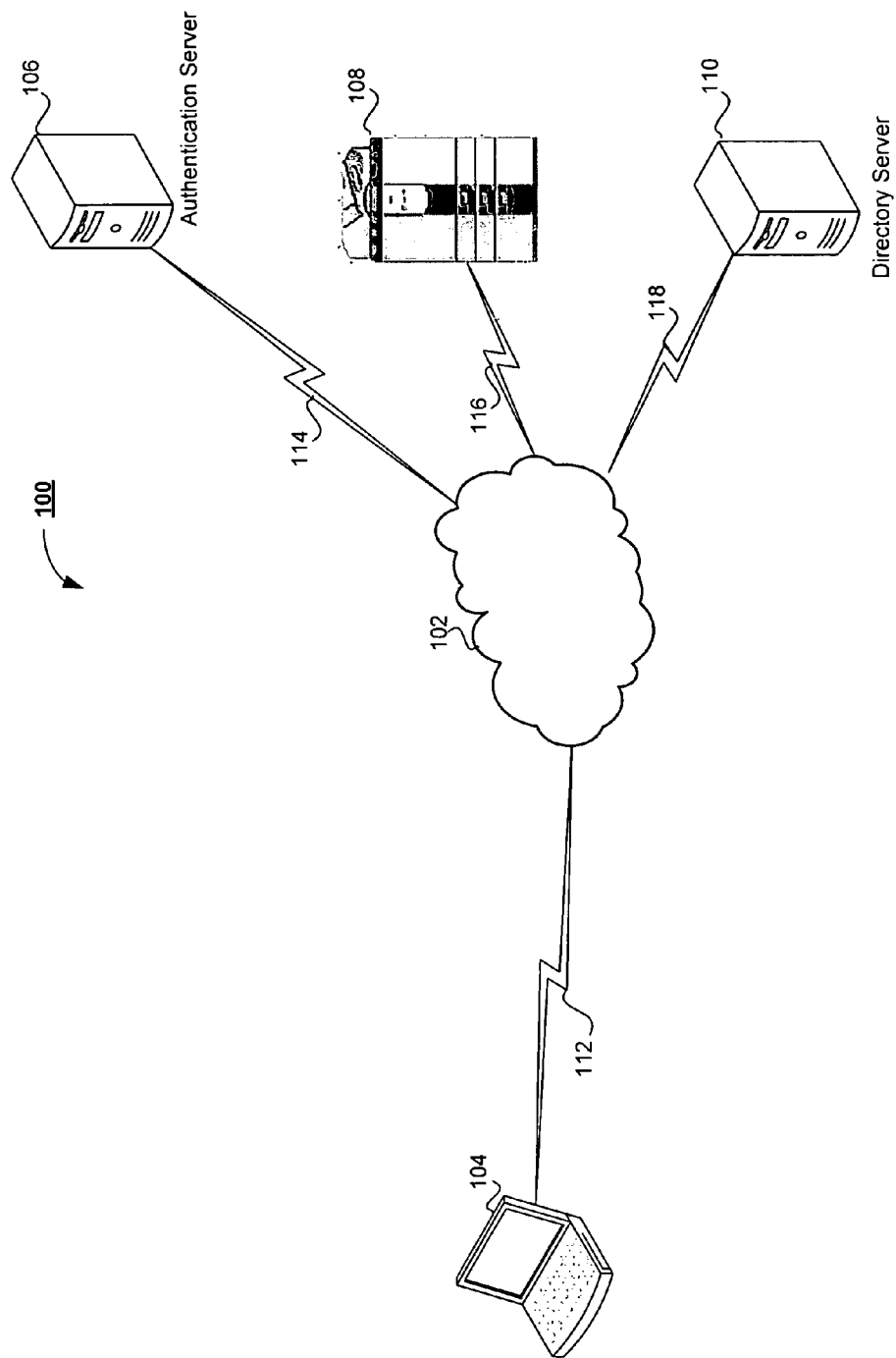
FIG. 1 is a block diagram illustrative of the system of the present invention.

Referring now to FIG. 1, there is shown a block diagram illustrating a system 100 in accordance with the present invention. As illustrated in FIG. 1, the system 100 suitably includes a computer network 102 operatively coupled to a variety of electronic devices. It will be understood by the skilled artisan that the computer network 102 is any computer network known in the art capable of enabling the communication of data between two or more electronic devices. Suitable computer networks include, for example and without limitation, Ethernet-based, Token Ring-based, local area networks, wide area networks, personal area networks, intranets, the Internet, and the like. In one particular embodiment, the computer network 102 is advantageously capable of employing one or more administratively enabled security protocols, such as user identifications and password combinations, public/private key encryption, certificates, and the like, whereby access to the network 102 and the devices connected thereto is suitably restricted to authorized entities.

In addition, the system 100 of FIG. 1 includes a client device 104, in data communication with the computer network 102 via a communications link 112. It will be appreciated by the skilled artisan that the client device 104 is any suitable electronic device known in the art capable of connecting to the computer network 102 and the other electronic devices connected thereto. Although illustrated in FIG. 1 as a laptop computer, those skilled in the art will understand that such a representation of the client device 104 is for illustration purposes only, and any other suitable electronic device is equally capable of being employed in accordance with the present invention. Thus, for example and without limitation, suitable client devices include desktop computers, a smart phone, a cellular-based personal electronic device, a web-based personal electronic device, and the like. It will further be understood by those skilled in the art, the communication link 112 is any suitable channel for communication between electronic devices known in the art, including, without limitation, wired communications links, wireless communications links, such as WiMax, 802.11(x), infrared, and the like. The skilled artisan will appreciate that the type of communications link 112 employed by the client device 104 is dependent upon the communications capabilities of the client device 104 and the computer network 102. Thus, the laptop computer client device 104 of FIG. 1 is advantageously capable of communicating with the computer network 102 via a wireless or wired link.

The system 100 also includes an authentication server 106, in data communication with the client device 104 via the computer network 102. As shown in FIG. 1, the authentication server 106 is communicatively coupled to the computer network 102 via a communications link 114. As will be understood by those skilled in the art, the communications link 114 is any communications channel known in the art capable of establishing data communication between two electronic devices. Suitable communications links include, but are not limited to, wireless communications channels, such as 802.11(x), WiMax, infrared, and the like, as well as wired communications channels. The skilled artisan will further understand that the authentication server 106 is any computer capable of functioning as a server in a client-server relationship, including a document processing device, a dedicated network server, and the like. Preferably, the authentication server 106 is capable of providing user authentication data to the client device 104, as set by a network administrator. For example, and without limitation, suitable authentication servers include Kerberos, Active Directory, and the like. It will be appreciated by the skilled artisan that the foregoing examples are software, as opposed to hardware, dependent, and other similar authentication mechanisms are equally capable of being employed in accordance with the present invention.

In one embodiment, the authentication server 106 is suitably adapted to provide user authentication information, such as user identification, authenticating server name, shared symmetric keys, public keys, Kerberos Tickets, Certificates issued by the authenticating server, and the like. Preferably, the user authentication information is provided to the client device 104 every time a user of the client device 104 logs onto the network 102, periodically based on administratively set procedures, static in nature, e.g., only upon the first logon will the authentication server provide the authentication information to the client device 104, and the like. As will be explained more fully below, the authentication information transmitted from the authentication server 106 to the client device 104 is representative of existing authentication information, generated by automatically or by a system administrator, as opposed to new authentication information, which is generated by the client device 104 for electronic document encryption and data security purposes.

As shown in FIG. 1, the system 100 also incorporates a document processing device 108, communicatively coupled to the computer network 102 via a suitable communications link 116. As will be understood by those skilled in the art, the document processing device is suitably an image generating device. Preferably, the document processing device is a multifunctional peripheral device, capable of providing scanning, copying, facsimile, printing, document management, document storage, electronic mail, and other functions to a user. Thus, when reference hereinafter is made to a document processing device, the skilled artisan will appreciate that a server is equally capable of being employed in accordance with the present invention. Suitable commercially available image generating devices include, but are not limited to, the Toshiba e-Studio Series Controller. In one embodiment, the document processing device 108 is suitably equipped to receive a plurality of portable storage media, including without limitation, Firewire drives, USB drives, SD, MMC, XD, Compact Flash, Memory Stick, and the like. The communications link 116 is any suitable channel of data communications known in the art including, but not limited to wireless communications, for example and without limitation, Bluetooth, WiMax, 802.11a, 802.11b, 802.11g, 802.11(x), infrared, optical, or any suitable wireless data transmission system, or wired communications known in the art.

The system 100 also includes a directory server 110 communicating with the computer network 102 via a communications link 118. It will be appreciated by those skilled in the art that the directory server 110, while shown as separate in the system 100, is capable of being implemented as a part of the authentication server 106. As will be apparent to those skilled in the art, the directory server 110 is shown as external to the authentication server 106; however the functions of the directory server 110 are capable of being performed by the authentication server 106.

In operation, the client device 104 is suitably equipped to generate new authentication information so as to enable the secure transmission of electronic document data over the computer network 102. For example, and without limitation, such new authentication information includes public keys corresponding to the user of the client device 104, symmetric encryption keys, other cryptographic data, and the like. Once this new authentication information is generated, the client device 104 encrypts an electronic document using the new authentication, for example, using a symmetric encryption key, which must be transmitted to the document processing device 108 in order for further document processing operations. To facilitate this decryption by the document processing device 108, the client device incorporates the new authentication information into an encrypted header accompanying the document processing request. Preferably, the header is encrypted using the public key of the document processing device 108 received from the authentication server 106 during the initial logon of the client device 104.

When the document processing device 108 receives the encrypted document processing request, to verify that the user is authorized to request document processing services and enable the decryption of the encrypted electronic document, the document processing device 108 decrypts the header using the document processing device 108 private key associated with the public key used to encrypt the header. The decrypted header preferably includes information designating an authentication mechanism, such as a dedicated authentication server, directory server or other document processing device trusted by the client device 104. In accordance with the present invention, when the designated authentication mechanism is trusted by the document processing device 108, i.e., when the document processing device 108 and the authentication mechanism have a previously established trusted relationship, further processing of the secure document processing request is enabled. When the authentication mechanism designated by the header is not recognized or trusted by the document processing device 108, the secure document processing request is terminated.

Figure 2:
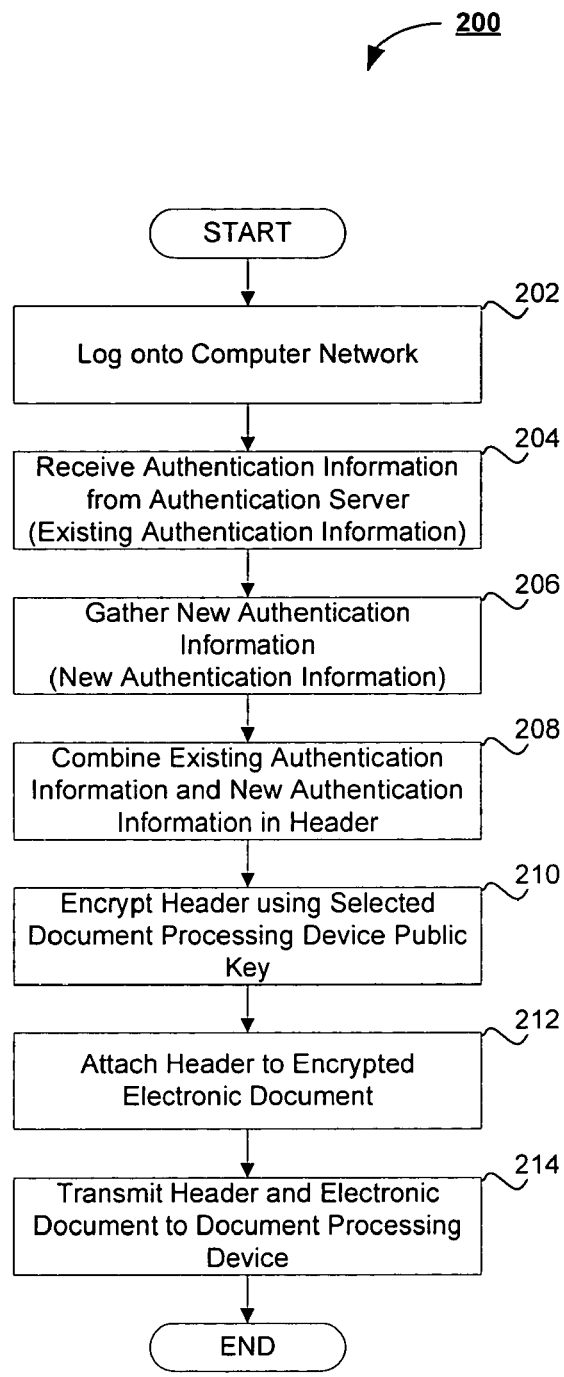
FIG. 2 is a flowchart illustrating an authentication gathering method according to the present invention.

Turning now to FIG. 2, there is shown a flowchart 200 illustrating the creation of a header portion of an electronic document containing existing and new authentication information. Beginning at step 202, a user, from the client device 104, logs onto the computer network 102 via any suitable means known in the art. Preferably, the initial logon of the client device 104 requires the connection of the client device 104 to the authentication server 106. Following the initial logon of the client device 104, flow proceeds to step 204, wherein the client device 104 receives authentication information from the authentication server. In the preferred embodiment, the authentication information received by the client device 104 from the authentication server 106 includes the public encryption key associated with the document processing device 108. In addition, other existing authentication information includes, but is not limited to, user identification, authenticating server name, shared symmetric keys, public keys, Kerberos Tickets, Certificates issued by the authenticating server, and the like.

Following receipt of the existing authentication information, flow proceeds to step 206, wherein the client device 104 generates new authentication information. Preferably, the new authentication information includes, but is not limited to, public encryption keys associated with the user, symmetric password-based keys, other cryptographic data, and the like. As will be understood by those skilled in the art, the use of new encryption information enables a further level of security to electronic documents transmitted via the computer network 102 as the client device 104 is able to limit those users and other network devices from gaining access to some or all of the newly generated encryption keys, passwords, and other cryptographic data. The new authentication information and the existing authentication information are then combined at step 208 into a header associated with the electronic document being sent to the document processing device 108. The header is then encrypted, at step 210, using the public key associated with the document processing device 108. The encrypted header is attached to the encrypted electronic document, which preferably has been encrypted using the new authentication information, at step 212. The encrypted header and electronic document are then sent, via the computer network 102, to the selected document processing device 108 at step 214.

Figure 3:
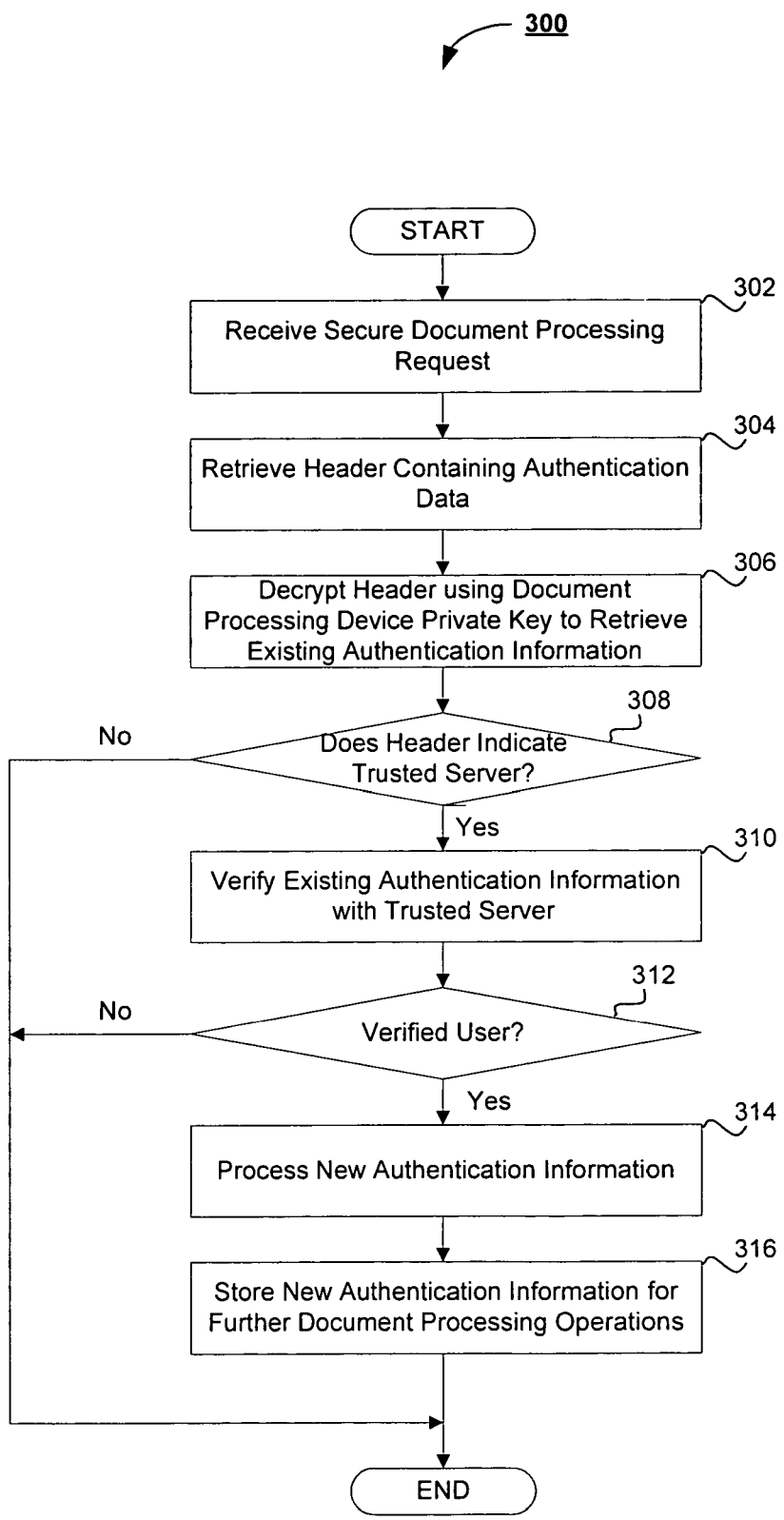
FIG. 3 is a flowchart illustrating a secure transmission method according to the present invention.

In accordance with the present invention, FIG. 3 illustrates a method for decryption of the header information and the validation of the new authentication information. As shown in FIG. 3, the flowchart 300 depicts the method whereby new authentication information is cross-checked against existing authentication information and used for further secure document processing services. Beginning at step 302, the document processing device 108 receives a secure document processing request from the client device 104 over the computer network 102. It will be understood by those skilled in the art that the secure document processing suitably includes, but is not limited to, a header portion encrypted using the public key of the document processing device to which the request is sent, as well as encrypted electronic document data. Preferably, the key or other cryptographic data required to decrypt the encrypted electronic document data is stored in part or all in the header.

At step 304, the document processing device 108 retrieves the header portion from the document processing device via any suitable means known in the art. At step 306, the document processing device 108 decrypts the encrypted header using the private key associated with the document processing device 108. As a result of the decryption of the encrypted header, the new and the existing authentication information are made available to the document processing device 108. Following decryption of the header, a determination is made at step 308 whether or not the header indicates a trusted server. Stated another way, the document processing device 108 must determine whether or not the authentication server 106 designated in the header has a trusted relationship with the document processing device 108. Thus, when the document processing device 108 and the authentication server 106 have never exchanged certificates, trust symbols, and the like, the document processing device 108 does not trust the authentication server 106 to authenticate the request, and the process terminates.

When the document processing device 108 and the authentication server 106 have a previously established trusted relationship, flow proceeds to step 310, wherein the existing authentication information is verified. Preferably, the document processing device 108 requests that the authentication server 106 validate the existing authentication information to determine that the user that sent the secure document processing request is a user that is authorized to use the document processing services offered by the document processing device 108. The authentication server 106 preferably reviews the existing authentication information and compares that information to the information stored on the server, i.e., the information established during the initial logon of the user. When the existing authentication information does not match that which is stored on the authentication server, an error is returned to the document processing device via any suitable means and the operation terminates.

A determination is then made at step 312 whether the user is verified via any suitable means. In the preferred embodiment, when the existing authentication information is not verified by the authentication server 106, the secure document processing operation is terminated. When the user has been verified, flow proceeds to step 314, wherein the new authentication information is processed. The new authentication information is then stored at step 316 by the document processing device 108. In one embodiment, the new authentication information is published in the authentication server 106, directory server 110, or a combination of the two, and thereby enables the use of the new authentication information by establishing a source for other document processing devices having a trust relationship with the authentication server 106, directory server 110, to retrieve the new authentication information and provide document processing services to the client device 104. In addition, those skilled in the art will appreciate that the foregoing method further enables the migration of trust information from one server to another, allowing a user to request secure document processing operations from document processing devices across domains, networks, and the like.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for propagation of security information for secure information exchange comprising:
    a document device in data communication with a document processor, the document device configured to,
        receive a first authentication data portion from a trusted server,
        append the first authentication data portion to a second authentication data portion, representative of a new authentication operation, which second authentication data portion is uniquely assigned to the document device, and
        transmit a first electronic document to the document processor with a header portion inclusive of the first and second authentication data portions and instructions for processing of the electronic document;
    a controller, associated with the document processor, configure to receive the first electronic document and header portion from the document device into a controller associated with the document processor, the controller being inclusive of a processor operating in conjunction with a data storage;
    the controller configured to access the trusted server corresponding to the first authentication data portion;
    the controller configured to receive, from the trusted server, confirmation data representative of acceptability of the second authentication data portion; and
    the document processor configured to register the document device for future document processing operations in accordance with received confirmation data.

2. The system for propagation of security information for secure information exchange of claim 1, wherein the document processor is configured to:
    receive at least one additional electronic document after receipt of the first electronic document, which the at least one additional electronic document includes the second authentication data portion that does not include the first authentication data portion;
    test the second authentication data portion of the at least one electronic document relative to the confirmation data; and
    selectively commence operation of an associated electronic document processing device so as to perform at least one processing operation on each at least one electronic document in accordance with an output of the testing means.

3. The system for propagation of security information for secure information exchange of claim 2, wherein the trusted server is associated with a network domain of the document processing.

4. The system for propagation of security information for secure information exchange of claim 3, wherein the first authentication data portion is contained in a header.

5. The system for propagation of security information for secure information exchange of claim 4, wherein the header is encrypted with a public key associated with the document processor.

6. The system for propagation of security information for secure information exchange of claim 5, wherein the document processor is configured to decrypt the encrypted header using a private key associated with the document processor.

7. A method for propagation of security information for secure information exchange comprising the steps of:
    receiving, at a document device in data communication with a document processor, a first authentication data portion from a trusted server; and
    appending, via the document device, the first authentication data portion to a second authentication data portion, representative of a new authentication operation, which second authentication data portion is uniquely assigned to the document device, and
    transmitting, via the document device, a first electronic document to the document processor with a header portion inclusive of the first and second authentication data portions and instructions for processing of the electronic document; and
    receiving the first electronic document and header portion from the document device into a controller associated with the document processor, the controller being inclusive of a processor operating in conjunction with a data storage;
    accessing the trusted server corresponding to the first authentication data portion;
    receiving, from the trusted server, confirmation data representative of acceptability of the second authentication data portion; and
    registering the document device with the document processor for further document processing operations in accordance with received confirmation data.

8. The method for propagation of security information for secure information exchange of claim 7, further comprising the steps of:
    receiving, at least one additional electronic document after receipt of the first electronic document, which the at least one additional electronic document includes the second authentication data portion that does not include the first authentication data portion;
    testing the second authentication data portion of the at least one electronic document relative to the confirmation data; and
    selectively commencing operation of an associated electronic document processing device so as to perform at least one processing operation on each at least one electronic document in accordance with an output of the testing.

9. The method for propagation of security information for secure information exchange of claim 8, wherein the trusted server is associated with a network domain of the document processor.

10. The method for propagation of security information for secure information exchange of claim 9, wherein the first authentication data portion is contained in a header.

11. The method for propagation of security information for secure information exchange of claim 10, wherein the header is encrypted with a public key associated with the document processor.

12. The method for propagation of security information for secure information exchange of claim 11, further comprising the step of decrypting the encrypted header using a private key associated with the document processor.

13. A computer-readable storage medium of instructions with computer-readable instructions stored thereon for propagation of security information for secure information exchange comprising:
   instructions for receiving, at a document device in data communication with a document processor, a first authentication data portion from a trusted server; and
   instructions for appending, via the document device, the first authentication data portion to a second authentication data portion, representative of a new authentication operation, which second authentication data portion is uniquely assigned to the document device, and
   instructions for transmitting, via the document device, a first electronic document to the document processor with a header portion inclusive of the first and second authentication data portions and instructions for processing of the electronic document; and
   instructions for receiving the first electronic document and header portion from the document device into a controller associated with the document processor, the controller being inclusive of a processor operating in conjunction with a data storage;
   instructions for accessing the trusted server corresponding to the first authentication data portion;
   instructions for receiving, from the trusted server, confirmation data representative of acceptability of the second authentication data portion; and
   instructions for registering the document device with the document processor for future document processing operations in accordance with received confirmation data.

14. The computer-readable storage medium of instructions with computer-readable instructions stored thereon for propagation of security information for secure information exchange of claim 13, further comprising:
   instructions for receiving at least one additional electronic document after receipt of the first electronic document, which the at least one additional electronic document includes secondary authentication data that does not include the first authentication data portion;
   instructions for testing the secondary authentication data of the at least one electronic document relative to the confirmation data; and
   instructions for selectively commencing operation of an associated electronic document processing device so as to perform at least one processing operation on each at least one electronic document in accordance with an output of the testing means.

15. The computer-readable storage medium of instructions with computer-readable instructions stored thereon for propagation of security information for secure information exchange of claim 14, wherein the trusted server is associated with a network domain of the document processor.

16. The computer-readable storage medium of instructions with computer-readable instructions stored thereon for propagation of security information for secure information exchange of claim 15, wherein the initial authentication data is contained in a header.

17. The computer-readable storage medium of instructions with computer-readable instructions stored thereon for propagation of security information for secure information exchange of claim 16, wherein the header is encrypted with a public key associated with the associated document processing device.

18. The computer-readable storage medium of instructions with computer-readable instructions stored thereon for propagation of security information for secure information exchange of claim 17, further comprising instructions for decrypting the encrypted header using a private key associated with the associated document processing device.

* * * * *

UNITED STATES PATENT AND TRADEMARK OFFICE
CERTIFICATE OF CORRECTION

PATENT NO. : 7,716,481 B2
APPLICATION NO. : 11/272904
DATED : May 11, 2010
INVENTOR(S) : Sameer Yami, Amir Shahindoust and Michael Yeung It is certified that error appears in the above-identified patent and that said Letters Patent is hereby corrected as shown below:

Col. 8, claim 3, replace the claim as followed:

--3. The system for propagation of security information for secure information exchange of claim 2, wherein the trusted server is associated with a network domain of the document processing device.--

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,716,481 B2 |
| APPLICATION NO. | : 11/272904 |
| DATED | : May 11, 2010 |
| INVENTOR(S) | : Sameer Yami, Amir Shahindoust and Michael Yeung |

It is certified that error appears in the above-identified patent and that said Letters Patent is hereby corrected as shown below:

Col. 8, lines 11-14, claim 3, replace the claim as followed:

--3. The system for propagation of security information for secure information exchange of claim 2, wherein the trusted server is associated with a network domain of the document processing device.--

This certificate supersedes the Certificate of Correction issued July 6, 2010.

Signed and Sealed this

Third Day of August, 2010

David J. Kappos
*Director of the United States Patent and Trademark Office*